Figures 1, 2, 3, 4, 5:
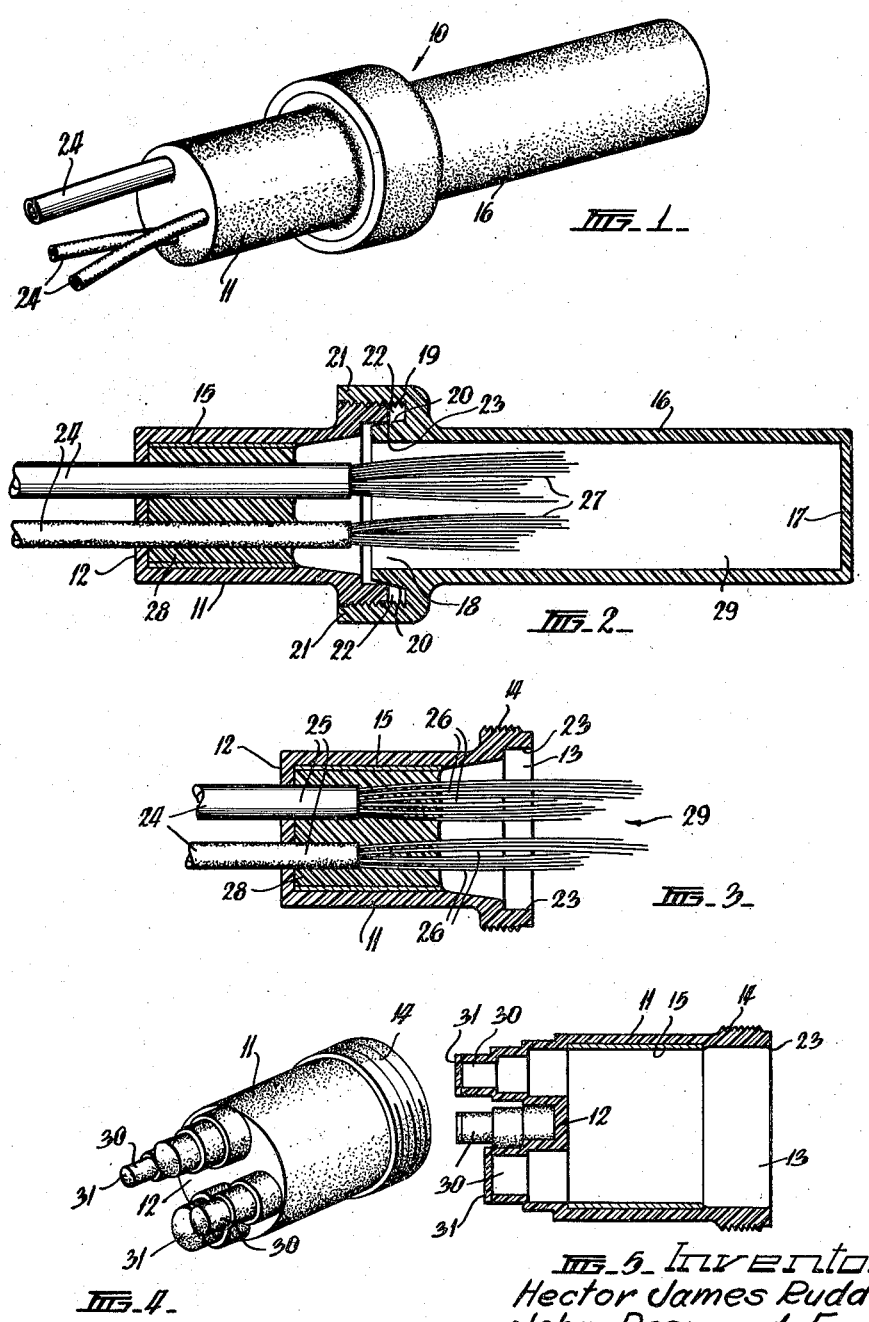

Inventors
Hector James Ruddell
John Desmond Feehan

United States Patent Office 3,209,069
Patented Sept. 28, 1965

3,209,069
JOINT ENCLOSURE FOR JOINED ELECTRIC CABLES
Hector James Ruddell, North Balwyn, Victoria, and John Desmond Feehan, Beaumaris, Victoria, Australia, assignors to Commonwealth of Australia
Filed Aug. 27, 1962, Ser. No. 219,389
3 Claims. (Cl. 174—138)

This invention relates to methods for joining multi-wire electric cables and to joints made by such methods in which the connections between the individual conductors of the cables are protected from the effects of moisture in the surrounding atmosphere or other medium. More particularly, the invention relates to such joints of, and methods for joining, telecommunication cables in which the connections between the individual conductors are accessible for maintenance, repair and testing.

There are many cable joining methods and appliances at present in use but all of them suffer form one or more disadvantages, such as, for example, deterioration of component parts, necessity to provide water barriers, moisture proof shields or containers in addition to the actual cable joint itself, dependence on the quality of the joint on the technique and skill of the operator making the joint, unsuitability for joining cables having sheaths and insulants of different materials, and difficulty of gaining access to the individual connections of the conductor wires of the joined cables.

It is the object of the present invention to provide a cable joining method in which the disadvantages referred to above are largely overcome.

It is a further general object of the invention to provide a cable joint which does not suffer from the drawbacks of cable joints at present in use.

According to the present invention there is provided a method for joining insulated multi-wire cables comprising the steps of inserting the ends of the cables into a base section of a two-part container, said base section being of thermo-plastic material and having a metal lining incorporated therein, embedding a portion of the ends of the cable to be joined in casting resin so as to secure them to the base section of the container in a water-tight manner, making the electric connections between the conductors of the cables and enclosing such connections by securing a cap section of the container over the base section to effect a water-tight junction between the sections. Preferably the water tightness of the junction is ensured by the mating of the end of one section with a wedge shaped annular groove in the other section. Preferably also the said end is formed with a sharp edge which bears against a tapered surface defining the wedge shaped groove.

Preferably also screw threads are provided on both the base section and cap section of the container, so that the cap section may be screwed over the base section to enclose the conductor joints and provide the water-tight seal, when the sections are screwed together, by virtue of the engagement of a sharp edge on one section with a tapered surface on the other section. Preferably also the base section of the container is closed at one end, and apertures are made therein to permit the cables to be inserted into the container, said apertures being subsequently sealed by the casting resin.

The invention also provides a joining chamber for multi-wire electric cables comprising a container of thermoplastic material having a base section and a cap section, the base section being provided with an internal metallic lining or sleeve, and being adapted to receive the cables to be joined through one end thereof, and means for securing and maintaining the cap section in water-tight contact with the base section. Preferably there is provided a sharp circular edge on one of the said sections and a tapered part-conical surface on the other of the said sections, whereby the circular edge is adapted to abut against the tapered surface when the two sections are secured together to provide a water-tight seal therebetween.

In order that the invention may be more fully understood, practical embodiments thereof will now be described in detail with reference to the accompanying drawings, in which:

FIGURE 1 is a perspective view of an assembled cable joint according to this invention;
FIGURE 2 is a longitudinal cross-section of an assembled cable joint of the type shown in FIGURE 1;
FIGURE 3 is a longitudinal cross-section of the base section of the cable joint of the type shown in FIGURE 1;
FIGURE 4 is a perspective view of a modified base section of the cable joint; and
FIGURE 5 is a longitudinal cross-section of the base section of the cable joint shown in FIGURE 4.

Referring now to the drawings, it is seen that the container or tube, indicated generally by 10 in FIGURE 1, and in which the cable joint is housed, is conveniently made of a thermo-plastic material such as polyethylene, polyvinylchloride or the like. The base section 11 of the tube 10 is cylindrical in shape, having a closed end 12 and an open end 13. An external screw thread 14 is provided at or near the open end 13 of the base section 11 and an open, cylindrical brass insert 15 is incorporated in the tube near the closed end of its base section 11 so as to form an inner lining or bushing therein. The brass insert 15 is moulded into the base section 11 when the tube is formed, whereby a water-tight joint is obtained between the brass surface and the thermo-plastic material. After the moulding operation the shrinkage of the thermo-plastic material on cooling is greater than that of the brass and the walls of the base section 11 of the tube shrink or contract over the brass insert 15 and an intimate, strong seal therebetween is thus obtained.

The cap section 16 of the tube 10 is also cylindrical in shape, having one closed end 17 and one open end 18. Internal screw threads 19 are arranged near the open 18, so that the cap section 16 may be screwed over the base section 11. A generally frusto-conical surface 20 is disposed inside the cap section 16 near its open end 18. The surface 20 is formed integrally with the cap section 16, and is tapered in a direction away from the closed end 17. The portion of the walls 21 of the cap section 16, which is located at the open end 18 of the cap section 16 is separated from the tapered surface 20 by an annular wedge-shaped clearance space 22. The base section 11 of the tube 10 has a sharp, circular, inwardly directed edge 23 at its open end 13 which, when the cap section 16 is screwed over the base section 11 is arranged to enter the wedge-shaped clearance space 22 and abut against the frusto-conical surface 20. On tightening the cap 16 over the base 11, the sharp edge 23 abuts or closely contacts the tapered frusto-conical surface 20, so that the line contact therebetween provides a water-tight seal between the cap 16 and the base 11 of the tube 10.

The method of forming a water and moisture-tight joint between two or more multi-wire cables 24, using a tube of the type described above, will now be explained. Firstly, a required number of apertures are cut or punched in the closed end 12 of the base 11 of the tube 10 and the cables are passed therethrough. The insulating sheath 25 of the cables 24 is removed, so that the covered cable 24 extends inside the container for a distance only of the order of one inch (as shown in FIGURE 3), the remainder of the cable 26 inside the tube being uncovered. Where one or several of the cables to be joined is polyethylene sheathed, the portion within the tube is preferably heated in an oxidizing flame to bring about a chemical reaction in the surface of the sheath, as a result of which adhesion between the sheath and the resin is improved. If there are any wrappings about the unsheathed portions of the cables 24, then these are removed, and the individual, insulated conductors 27 are spread out. Liquid casting resin 28 is then poured into the base 11 of the tube 10 until the brass insert 15 is completely covered, care being taken to ensure that resin penetrates thoroughly between the spread-out conductors 27, thus preventing any moisture, which may enter the cable, from penetrating into the joint. On setting, the resin 28 serves to seal the entry of the cable 24 into the tube 10 and also to mould in the uncovered wires 27 (which are still individually insulated) of the cable in a block of resin 28 which is bonded to the brass insert 15 located in the tube 10. The wires 27 of the cables 24 extend through the layer of casting resin 28, and the necessary electrical cross-connections between the wires 27 are now made by stripping the wires of their insulation and connecting them in any one of many known ways, such as by soldering and sleeving within the space 29 of the cap 16. The electrical connections between the individual wires 27 of the cables are sealed in the tube 10 in a water-tight manner by screwing on of the cap 16 of the tube, in the manner already described above. Thus it can be seen that the number and type of connections which are made between the conductors or wires 27 of the cables 24 which are to be joined are limited only by the space 29 available within the tube 10 above the layer of casting resin 28. Preferably the majority of this space is provided within the cap 16, so that on removal thereof the conductors 27 are accessible from all directions.

When gas filled cables have to be joined, the above method is modified slightly, insofar that the covered cables 24 are extended right through the resin 28, as shown in FIGURE 2. This ensures that the insulating gas of the cables is prevented from leaking away, since the space 29, into which the cables enter, is securely sealed, on one side, by the resin 28, and on the other side by the engagement between the sharp edge 23 of the base 11 and the tapered surface 20 of the cap 16.

According to a further feature of the invention, the closed end 12 of the base 11 is provided with a number of hollow cylindrical protrusions or outwardly projecting adaptor sleeves 30 of various sizes, as shown in FIGURES 4 and 5. The internal sizes of the individual cylindrical protrusions 30 are chosen to correspond to the most used standard cable diameters and, in order to provide as great a selection of cable diameters as possible, a number of sleeves are arranged one above the other to form stepped, projecting hollow cylinders, as shown in the drawings. The protrusions or sleeves 30 are formed with their ends 31 closed. When a cable has to be inserted into a base section 11 which is provided with these adaptor sleeves or protrusions 30, one of the protrusions is cut through at the appropriate place, which corresponds to the diameter of the cable which is to be led into the base section, and the cable is inserted through the opening thus formed. In this way a better correspondence between the size of the openings and the size of the cables fitted therein is usually obtained, and time is saved in the installation of the joint. Also, an operator does not have to be provided with a set of tools for cutting or punching the apertures in closed end of the base section.

The cap may be unscrewed from the base of the tube whenever repair or maintenance of the conductor connections is required. On replacement of the cap a water-tight seal is again formed on tightening of the cap, since the material from which both parts of the container are made is sufficiently resilient to permit slight deformation, on engagement, of both the sharp edge on the base and the tapered surface of the shell on the cap, so that an effective seal is obtained despite repeated opening and closing of the tube.

It has been found that adherence or bonding between most casting resins and thermo-plastic materials, of the type of which the tube is made, is not very good and the shape of the base does not readily permit surface treatment to improve the adherence, but this has been overcome by the use of the brass insert. The brass insert, being moulded into the walls of the tube is secured thereto in such a way that a watertight seal exists between it and the walls of the tube as already explained previously. The casting resin, on setting, adheres in a water-tight manner to the cleaned surface of the brass insert, the sheaths of the cables and contracts around the conductors themselves, so that a water- and moisture-tight closure is obtained at the base of the tube, sealing the entry of the cables.

The method of making joints between multi-wire electric cables according to the present invention, and joints made by this method, have been found to be very satisfactory in use. It will be appreciated that the conductor connections of the cables are readily accessible merely by unscrewing and subsequently replacing the cap section of the tube. The joint is water- and moisture-proof, and this property is not affected even by repeated opening and closing of the joint for maintenance and inspection. One of the main advantages of a method according to this invention is that it permits cables having sheaths of different materials to be joined, for example, lead and plastic sheathed cables may be joined in a single joint of the type described herein.

Furthermore, the method of making joints disclosed herein is very convenient and easy to perform in the field, and the quality of a joint made by this method does not depend on the skill of the operator, provided that a simple standard working procedure is followed. Accordingly it is seen that the present invention provides a worthwhile improvement over the prior art in this field.

In a modification of the invention, which may be sometimes made use of if the external sheaths of all the cables to be joined are made of plastic, the casting resin or other liquid sealing compound is dispensed with altogether. In this case each of the cables is led into the base section of the tube through an appropriate adaptor sleeve, which is then welded by hot gas or heated tool welding to the sheath of the cable, whereby a secure seal is obtained between each cable sheath and the tubular chamber, and the casting resin is not required to be used.

The invention is not intended to be limited to the practical embodiment here described by way of example, since many variations and modifications may be made which are within the spirit and scope of the invention disclosed herein. Thus a "double-ended" joint, having two base sections connected by a cap may be devised. Also, other suitable sealing compounds, such as waxes, may be used in place of the casting resin, or plastic welding as previously referred to, may be utilized to replace sealing compounds entirely.

We claim:

1. An article of manufacture, a joining chamber for sheathed multi-wire electrical cables which comprises a container of plastic material having a cylindrical base section which is closed at one end through which cables are adapted to extend, an internal metallic lining in the base section, a cap section, means securing the cap section to the base section and means forming a water-tight seal between the base section and the cap section, wherein the means forming a water-tight seal between the cap section and the base section comprises a sharp circular edge on one of the sections and a tapered part-conical surface on the other of the said sections, the circular edge abutting against the tapered surface when the two sections are secured together to provide a water-tight seal therebetween.

2. An article of manufacture, a joining chamber for cables as claimed in claim 1, wherein the closed end of the base section of the container is provided with at least two outwardly directed hollow cylindrical projections which are arranged generally parallel to the axis of the base section, said projections serving as adaptors capable of receiving and snugly engaging sheathed cables of various external diameters which are to be joined in the chamber.

3. An article of manufacture, a joining chamber for cables as claimed in claim 1, wherein the means securing the cap section to the base section comprise an external screw thread on the base section and a mating internal screw thread within the cap section.

References Cited by the Examiner

UNITED STATES PATENTS

| 2,862,042 | 11/58 | Bollmeier | 174—93 |
| 2,977,456 | 3/61 | Stiebel. | |

FOREIGN PATENTS

| 576,084 | 5/59 | Canada. |
| 880,376 | 10/61 | Great Britain. |

LARAMIE E. ASKIN, *Primary Examiner.*

JOHN P. WILDMAN, *Examiner.*